United States Patent [19]

Rodgers

[11] 4,147,028
[45] Apr. 3, 1979

[54] JET ENGINE THRUST REVERSER AND COWL STRUCTURE

[75] Inventor: Barry Rodgers, Mansfield, England

[73] Assignee: Rolls-Royce Limited, London, England

[21] Appl. No.: 830,351

[22] Filed: Sep. 2, 1977

[30] Foreign Application Priority Data

Sep. 11, 1976 [GB] United Kingdom ............... 37737/76

[51] Int. Cl.² .......................... F02C 3/06; F02K 3/06; F02K 1/20
[52] U.S. Cl. .................................... 60/226 A; 60/230; 239/265.29; 239/265.31
[58] Field of Search .............................. 60/226 A, 230; 239/265.13, 265.29, 265.31, 265.37

[56] References Cited

U.S. PATENT DOCUMENTS

| 3,500,646 | 3/1970 | Hom et al. | 60/226 A |
| 3,503,211 | 3/1920 | Medawar et al. | 60/226 A |
| 3,601,992 | 8/1971 | Maison | 60/226 A |
| 3,608,314 | 9/1971 | Colley | 60/230 |
| 3,616,648 | 11/1971 | Weise | 60/230 |
| 3,779,010 | 12/1973 | Chamay et al. | 60/226 A |

Primary Examiner—Carlton R. Croyle
Assistant Examiner—Thomas I. Ross
Attorney, Agent, or Firm—Cushman, Darby & Cushman

[57] ABSTRACT

A jet engine cowl includes a thrust reverser in which a cowl portion is movable to open a gap in the flow duct wall. The movable cowl portion is further divided, to enable one portion to be moved faster than its complementary portion. The difference in speed of movement provides a drive face to pivot blocker flaps across the flow duct.

3 Claims, 4 Drawing Figures

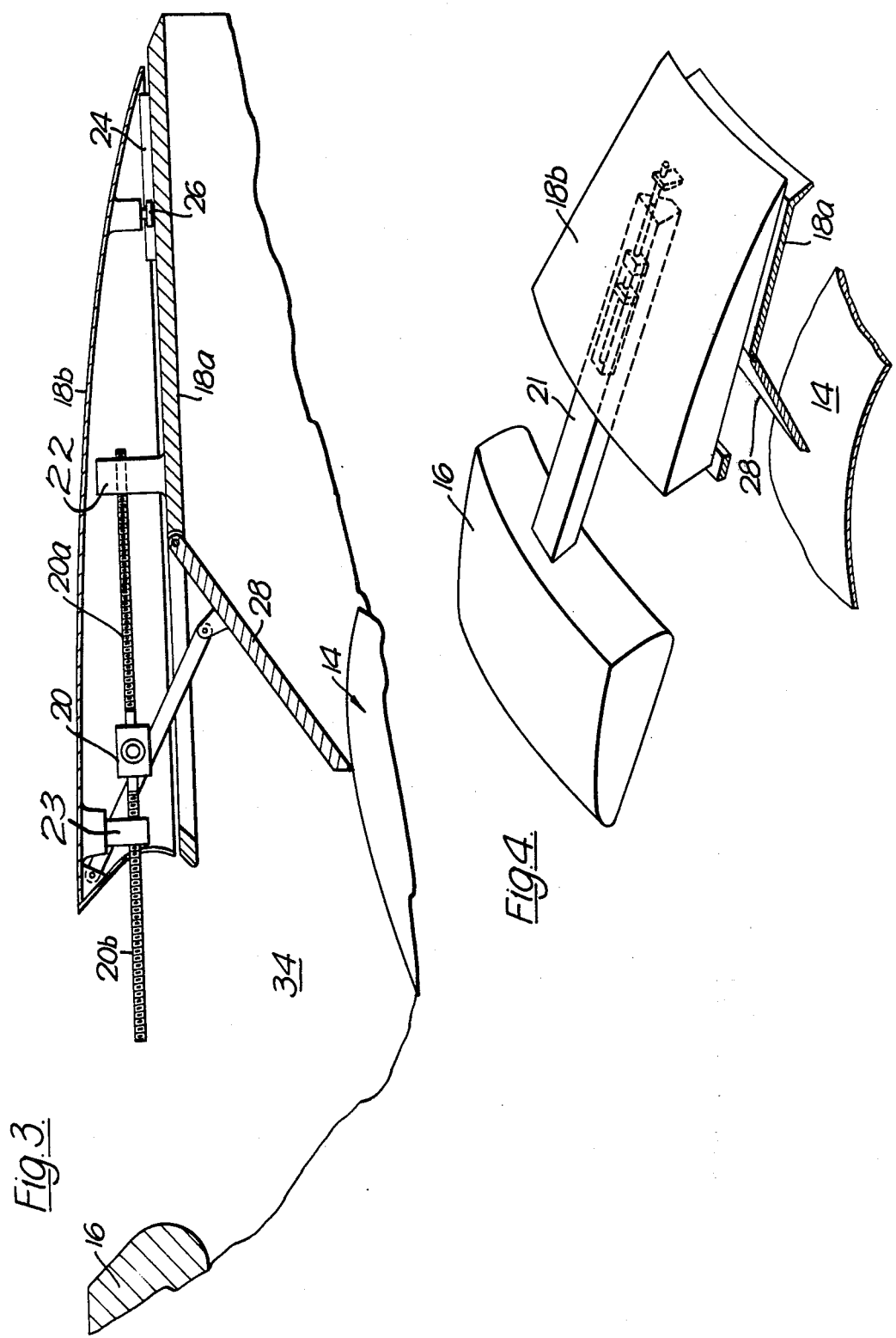

JET ENGINE THRUST REVERSER AND COWL STRUCTURE

This invention concerns jet engine thrust reversers and cowl structure.

Jet engines of the pure jet type and of the ducted fan gas turbine type are frequently provided with thrust reversing equipment with which to provide a braking force on landing. The thrust reversing equipment normally comprises means to block the through flow of hot gas and/or fan air and further means to enable the blocked flow to escape radially of the engine axis.

Where the engine is of the type which includes an annular duct, such as a pure jet engine with an exhaust bullet, or a ducted fan gas turbine comprising an annular fan duct surrounding a core gas generator, problems arise in that it is essential to have a sufficiently large radial outlet for the blocked flow to prevent choking of the flow as it is deflected onto its radial path by the throughflow blocking means, but circumstances dictate that the structure which first blocks the necessarily large radial outlet, also has to suffice to block the annular flow duct which, usually, is relatively small. Flaps have been tried which in a radial flow blocking position, extend a given length and in a throughflow blocking position, fold upon themselves to half their extended length, and are pivoted across the annular duct. These flaps work, but have proved difficult to seal against flow leakage between their abutting edges. Further, other flaps have been tried which have a short fixed length and a lost motion linkage has been arranged, to delay movement of these flaps across the annular duct until the radial outlet has been uncovered by moving the cowl downstream a sufficient distance. This arrangement again works, but is bad in that rattling occurs in the lost motion structure due to the buffeting flows around it, which results in fretting and excessive wear.

The present invention has for its object, the obviating of both large flaps and lost motion linkages, whilst still obtaining satisfactory blockage of both large and small apertures with common means. Consequently the present invention comprises a jet engine thrust reverser including a cowl and a central body which together form an annular flow duct, said cowl having a downstream portion translatable relative to the remainder thereof, said downstream portion comprising inner and outer wall members which are further translatable relative to each other, the upstream portion of the inner one of said wall members comprising a plurality of pivotable blocker flaps connected by links to said outer wall member, said outer wall member being translatable at a faster rate than said inner wall member so as to react on said flaps via said links, to pivot said flaps across the annular flow duct.

Preferably said central body comprises a core gas generator and said annular duct is a fan duct.

The invention will now be described by way of example with reference to the accompanying drawings in which:

FIG. 3 is a further enlarged cross-sectional part view of FIG. 1, and

FIG. 4 is a pictorial part view of FIG. 1.

Figure 1:
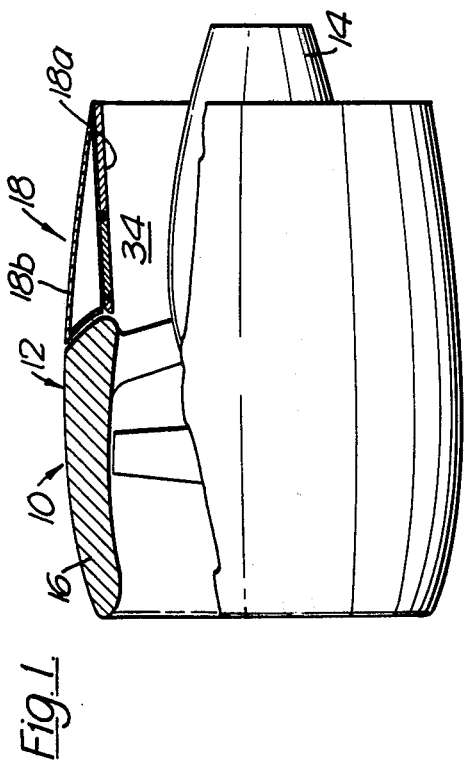
FIG. 1 is a diagrammatic view of a jet engine with a cowl and central portion.

In FIG. 1 a jet engine 10 has a cowl 12 and a central body 14, in the present example a core gas generator.

Cowl 12 comprises a fixed upstream portion 16 and a translatable downstream portion 18. Downstream portion 18 is comprised of inner and outer walls 18a, 18b.

Figure 2:
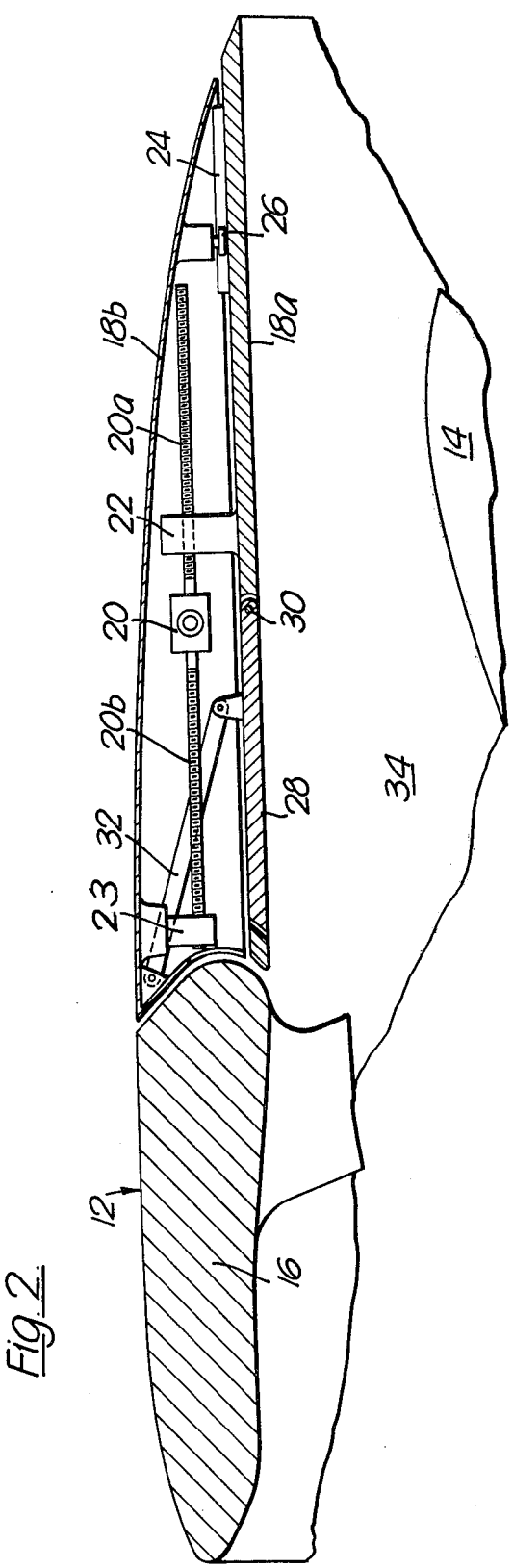
FIG. 2 is an enlarged cross-sectional part view of FIG. 1.

Referring now to FIG. 2 it will be seen that a gearbox 20 which is fixedly mounted to a beam 21 extending in known manner from upstream cowl portion 16, supports inner wall 18a via a ball nut 22 which is supported in a pedestal fixed to inner wall 18a and one end 20a of a double threaded ball screw and further supports outer wall 18b via a further nut 23 fixed to outer wall 18b. The downstream end of outer wall 18b is further located via rollers 26, in tracks 24 to inner wall 18a. This ensures that outer wall 18b is maintained concentric with inner wall portion 18a as will be explained later in this specification. Slide pads (not shown) could be substituted for rollers 26.

The upstream end of inner wall 18a has blocker flaps 28 cut out in a peripheral row and then reconnected via hinges 30. Blocker flaps 28 are connected by links 32 to the upstream end of outer wall 18b, which in the non-operative situation, prevents the flaps from pivoting across the annular duct 34.

In operation gearbox 20 is actuated by a flexible drive means (not shown) to rotate the screw portions 20a, 20b in a common direction and at a common speed of rotation. Portion 20a has a given pitch and causes inner wall 18a to translate downstream, taking flaps 28 with it. Portion 20b has a coarser pitch than 20a but of the same hand with the result that outer wall 18b translates downstream at a faster rate than portion 18a thus introducing relative movement between the two walls and, in consequence, bringing about a positional displacement of one relative to the other, in a direction parallel with the axis of the annulus formed by cowl 12 and central body 14. The result is that outer wall 18b exerts a force on flaps 28 via links 32 and causes the flaps to pivot about hinges 30, to a position wherein they block duct 34 (FIG. 3). The translation of walls 18a, 18b downstream does of course, open a radial gap in cowl 12 for the emission therefrom, of fluid in duct 34.

The concentricity of outer wall 18b relative to inner wall 18a is maintained by providing a plurality of tracks 24, spaced around inner wall 18a, arranged so as to lie symmetrically about a diameter of the cowl, and in each of which track is located a roller 26 which is rotationally mounted on outer wall 18b. A number of gearboxes 20 are arranged on respective beam 21 so as to provide a symmetric translating load on the respective wall members.

In view of the small radial dimension of duct 34 relative to the length of radial gap required in cowl 12, the flaps 28 do not have to pivot through a large angle to seal the duct. Consequently the difference in pitch between portions 20a, 20b need only be small, to achieve the necessary relative movement between inner and outer walls 18a, 18b respectively.

I claim:

1. A jet engine thrust reverser including a cowl and a central body which together form an annular flow duct, said cowl having an upstream portion and a downstream portion translatable relative thereto in an axial direction of said annular flow duct, said downstream portion comprising an inner wall member and an outer wall member, means operatively connected to said outer wall member and to said inner wall member to cause simultaneous differential positional displacement of said outer wall member and said inner wall member relative to each other in said axial direction with said outer wall member being axially translated at a faster rate than axial translation of said inner wall member, a plurality of blocker flaps pivoted to and defining an upstream portion of said inner wall member, and links connecting said flaps to said outer wall member, said links reacting on said flaps when said differential positional displacement means translates said outer wall member at a faster rate than said inner wall member to thereby cause said flaps to pivot across said annular duct.

2. A jet engine thrust reverser as claimed in claim 1 wherein said means to cause simultaneous differential positional displacement of said outer wall member and said inner wall member in the axial direction comprises a plurality of ball screws arranged in a fixed positional relationship with the upstream portion of said cowl and extending between said inner wall member and said outer wall member of the downstream portion of said cowl, each ball screw having a first ball screw thread of a given pitch formed on its upstream end, a ball nut for each ball screw, each said ball nut being affixed to said outer wall member and engaging the first ball screw thread of the respective ball screws, each ball screw having on its downstream end a second ball screw thread of a pitch which is finer than the pitch of said first thread and having a hand the same as the hand of said first ball screw thread, a second ball nut for each ball screw affixed to said inner wall member and engaging the second ball screw thread of the respective ball screws so that on rotation of the respective ball screws, said inner wall member and said outer wall member are driven in a direction parallel with the axis of said ball screws but at different speeds, said outer wall member translating faster than said inner wall member.

3. A jet engine thrust reverser as claimed in claim 2 wherein said inner wall member and said outer wall member of the downstream portion of said cowl are slidably engaged together by complementary tracks and rollers so as to maintain concentricity of said inner wall member and said outer wall member during relative axial translation thereof.

* * * * *

UNITED STATES PATENT AND TRADEMARK OFFICE
CERTIFICATE OF CORRECTION

PATENT NO. : 4,147,028
DATED : April 3, 1979
INVENTOR(S) : Barry Rodgers

It is certified that error appears in the above–identified patent and that said Letters Patent are hereby corrected as shown below:

[57] ABSTRACT
Line 6, delete "face" and insert --force--.

Signed and Sealed this

Seventh Day of August 1979

[SEAL]

Attest:

Attesting Officer

LUTRELLE F. PARKER
Acting Commissioner of Patents and Trademarks